United States Patent
Kolhouse et al.

(10) Patent No.: US 11,536,239 B2
(45) Date of Patent: Dec. 27, 2022

(54) VARIABLE ENERGY IGNITION SYSTEMS, METHODS, AND APPARATUSES

(71) Applicant: Cummins Inc., Columbus, IN (US)

(72) Inventors: J. Steven Kolhouse, Columbus, IN (US); Daniel J. O'Connor, Columbus, IN (US); Philipe F. Saad, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/530,596

(22) Filed: Nov. 19, 2021

(65) Prior Publication Data

US 2022/0074379 A1 Mar. 10, 2022

Related U.S. Application Data

(63) Continuation of application No. PCT/US2019/033214, filed on May 21, 2019.

(51) Int. Cl.
| | |
|---|---|
| *F02P 5/15* | (2006.01) |
| *F02D 19/02* | (2006.01) |
| *F02D 19/08* | (2006.01) |
| *F02P 3/045* | (2006.01) |
| *F02P 3/05* | (2006.01) |
| *F02P 5/152* | (2006.01) |
| *F02P 15/08* | (2006.01) |
| *F02P 15/10* | (2006.01) |

(52) U.S. Cl.
CPC ............ *F02P 5/151* (2013.01); *F02D 19/029* (2013.01); *F02D 19/084* (2013.01); *F02D 19/087* (2013.01); *F02P 3/045* (2013.01); *F02P 3/05* (2013.01); *F02P 5/1527* (2013.01); *F02P 15/08* (2013.01); *F02P 15/10* (2013.01)

(58) Field of Classification Search
CPC .......... F02P 5/151; F02P 5/1527; F02P 3/045; F02P 3/05; F02P 15/08; F02P 15/10; F02D 19/029; F02D 19/084; F02D 19/087; Y02T 10/30; Y02T 10/40
USPC ....... 123/406.3, 435, 1 A; 701/111; 73/35.02
See application file for complete search history.

(56) References Cited

U.S. PATENT DOCUMENTS

| | | | |
|---|---|---|---|
| 4,255,789 A | 3/1981 | Hartford et al. | |
| 4,619,236 A | 10/1986 | Okada et al. | |
| (Continued) | | | |

FOREIGN PATENT DOCUMENTS

| | | |
|---|---|---|
| DE | 10 2007 029 953 | 1/2009 |
| EP | 0 305 348 A1 | 3/1989 |
| (Continued) | | |

OTHER PUBLICATIONS

International Search Report and Written Opinion for PCT Application PCT/US2015/051094, dated Dec. 14, 2015, 10 pages.

*Primary Examiner* — Hai H Huynh
(74) *Attorney, Agent, or Firm* — Foley & Lardner LLP

(57) ABSTRACT

A method of controlling an ignitor for a spark-ignition engine includes receiving, by a controller, at least one of fuel quality data regarding a fuel for the spark-ignition engine or a characteristic regarding the ignitor for the spark-ignition engine. The method additionally includes controlling, by the controller, an ignition energy characteristic of the ignitor in response to the at least one of the fuel quality data regarding the fuel or the characteristic regarding the ignitor for the spark-ignition engine.

19 Claims, 6 Drawing Sheets

(56) References Cited

U.S. PATENT DOCUMENTS

| | | |
|---|---|---|
| 4,696,280 A | 9/1987 | Niggemeyer |
| 4,947,810 A | 8/1990 | Gillbrand et al. |
| 4,993,388 A | 2/1991 | Mitsumoto |
| 4,995,367 A | 2/1991 | Yamauchi et al. |
| 5,050,555 A | 9/1991 | Mitsumoto |
| 5,109,821 A | 5/1992 | Yoshida et al. |
| 5,230,309 A | 7/1993 | Suga et al. |
| 5,233,959 A | 8/1993 | Kojima |
| 5,255,656 A | 10/1993 | Rader et al. |
| 5,333,593 A | 8/1994 | Morganti et al. |
| 5,697,346 A | 12/1997 | Beck |
| 5,701,865 A | 12/1997 | Thomas et al. |
| 6,505,605 B2 | 1/2003 | Yamada et al. |
| 6,935,311 B2 | 8/2005 | Visser et al. |
| 7,255,080 B1 | 8/2007 | Leone |
| 7,305,939 B2 | 12/2007 | Carlson |
| 7,421,884 B2 | 9/2008 | Aoyama |
| 7,740,009 B2 | 6/2010 | Shelby et al. |
| 7,827,960 B2 | 11/2010 | Kawakita et al. |
| 7,909,019 B2 | 3/2011 | Stein |
| 7,997,255 B2 | 8/2011 | Asada et al. |
| 8,042,517 B2 | 10/2011 | Nakajima |
| 8,132,556 B2 | 3/2012 | Glugla et al. |
| 8,136,486 B2 | 3/2012 | Von Beck |
| 8,490,598 B2 | 7/2013 | Qu et al. |
| 8,550,059 B2 | 10/2013 | Makarov et al. |
| 8,584,650 B2 | 11/2013 | Peters et al. |
| 9,200,611 B2 | 12/2015 | Taniguchi et al. |
| 9,368,537 B1 * | 6/2016 | Holmes ................... H02S 40/44 |
| 9,458,773 B2 | 10/2016 | Glugla et al. |
| 9,771,917 B2 | 9/2017 | Geckler et al. |
| 9,777,697 B2 | 10/2017 | Glugla et al. |
| 9,926,904 B2 | 3/2018 | Kolhouse et al. |
| 9,945,344 B2 | 4/2018 | Glugla et al. |
| 10,054,098 B2 | 8/2018 | Shinohara |
| 2009/0114188 A1 | 5/2009 | Peters et al. |
| 2009/0241520 A1 | 10/2009 | Gendron et al. |
| 2009/0308070 A1 | 12/2009 | Alger et al. |
| 2010/0147263 A1 | 6/2010 | Russell et al. |
| 2010/0206267 A1 | 8/2010 | Glugla et al. |
| 2010/0235070 A1 | 9/2010 | Amano |
| 2011/0253100 A1 | 10/2011 | Kaiser et al. |
| 2012/0079831 A1 | 4/2012 | Kirzhner et al. |
| 2012/0303247 A1 | 11/2012 | Minami et al. |
| 2014/0076274 A1 | 3/2014 | Tozzi et al. |
| 2014/0196702 A1 | 7/2014 | Gingrich et al. |
| 2015/0128683 A1 | 5/2015 | Kumano et al. |
| 2015/0369202 A1 | 12/2015 | Shiraishi et al. |
| 2016/0097366 A1 | 4/2016 | Kolhouse et al. |
| 2017/0218863 A1 | 8/2017 | Geckler et al. |
| 2017/0276655 A1 * | 9/2017 | Li ....................... F02D 41/1402 |
| 2017/0350363 A1 | 12/2017 | Ferguson et al. |
| 2020/0018280 A1 * | 1/2020 | Dieringer ................ F02P 5/045 |

FOREIGN PATENT DOCUMENTS

| | | |
|---|---|---|
| EP | 0 640 761 A2 | 3/1995 |
| JP | S59-126041 | 7/1984 |
| JP | 06-002639 | 1/1994 |
| JP | 2000-291519 | 10/2000 |
| JP | 2002-091519 A | 3/2002 |
| WO | WO-2013/175091 | 11/2013 |
| WO | WO-2014/010246 A1 | 1/2014 |

* cited by examiner

VARIABLE ENERGY IGNITION SYSTEMS, METHODS, AND APPARATUSES

CROSS-REFERENCE TO RELATED APPLICATION

This Application is a Continuation of International Application No. PCT/US2019/033214, filed May 21, 2019, which is incorporated herein by reference in its entirety.

TECHNICAL FIELD

The present disclosure relates to systems and methods for engine ignition monitoring and control.

BACKGROUND

Spark-ignition (SI) engines rely on an ignitor (e.g., a spark plug, glow plug, etc.) to initiate combustion of an air-fuel mixture inside a combustion chamber. The chemical energy produced during combustion can be used to power a vehicle, a generator set (i.e., a genset), or another system utilizing the SI engine. The performance of the SI engine can vary greatly depending on many parameters, such as the quality of the fuel and parameters and characteristics relating to the ignitor. For example, fouling (build-up such as from dirt and oil) on the ignitor can lead to the ignitor not working as intended (e.g., not sparking, not sparking for as long as desired, etc.). Therefore, tracking parameters affecting performance of the SI engine, such as those relating to the ignitors, is beneficial to help mitigate circumstances that may lead to undesirable performance.

SUMMARY

On embodiment relates to a method. The method includes receiving, by a controller, at least one of fuel quality data regarding a fuel for a spark-ignition engine or a characteristic regarding an ignitor for the spark-ignition engine. The method additionally includes controlling, by the controller, an ignition energy characteristic of the ignitor in response to the at least one of the fuel quality data regarding the fuel or the characteristic regarding the ignitor for the spark-ignition engine.

Another embodiment relates to an apparatus. The apparatus includes an ignition control circuit. The ignition control circuit includes a memory storing machine readable instructions and a processor. The machine readable instructions are structured to cause the processor to perform operations including receiving fuel quality data regarding a fuel for a spark-ignition engine, receiving a characteristic regarding an ignitor of the spark-ignition engine, and controlling the ignitor in response to at least one of the fuel quality data or the characteristic regarding the ignitor for the spark-ignition engine.

Yet another embodiment relates to a system. The system includes an ignition control unit and an ignitor coupled to the ignition control unit. The ignition control unit is structured to control the ignitor based on fuel quality data of a fuel for a spark-ignition engine.

These and other features, together with the organization and manner of operation thereof, will become apparent from the following detailed description when taken in conjunction with the accompanying drawings.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

Figure 1:
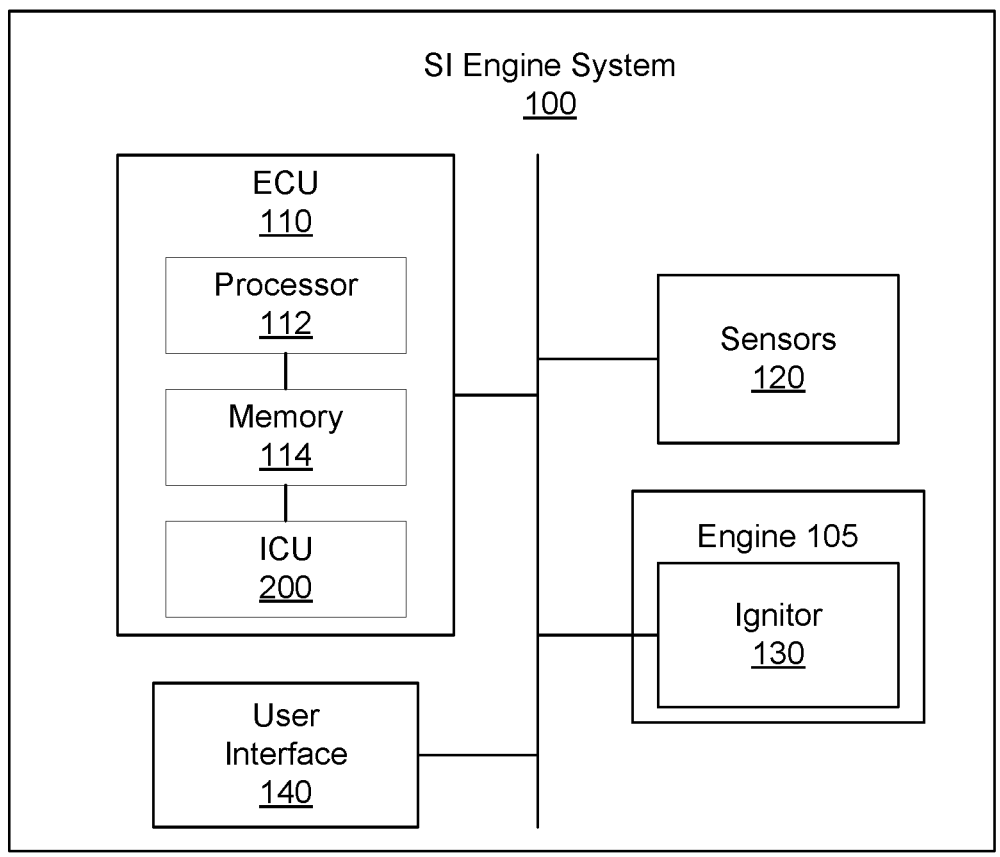
FIG. 1 is a block diagram of a spark-ignition engine, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for modifying ignition energy for an ignitor (or multiple ignitors) of a spark-ignition engine. The various concepts introduced above and discussed in greater detail below may be implemented in any number of ways, as the concepts described are not limited to any particular manner of implementation. Examples of specific implementations and applications are provided primarily for illustrative purposes.

Referring generally to the figures, the various embodiments disclosed herein relate to systems, apparatuses, and methods for controlling an ignitor of a spark-ignition (SI) engine. More specifically, embodiments herein relate to controlling an ignition energy provided to the ignitor. "Ignition energy" refers to the current and/or voltage provided to the ignitor, which affects the output from the ignitor (a spark, if a spark plug). The affects include a duration of a spark, when the spark is initiated, how many sparks are initiated within a time period or cycle, and so on. Existing systems and methods for controlling the ignition energy provided to the ignitor are insufficient under certain engine operating conditions. Specifically, these systems and methods do not account for the impact of varying fuel quality on the ignitor (e.g., on the useful operating lifetime of the ignitor before the electrodes have eroded or the engine performance impact associated with low quality fuels). Fuel quality issues are particularly problematic in SI natural gas engines, where the performance of the engine is highly sensitive to the methane number of the fuel. Relatively low methane number fuels tend to promote engine knock or pre-ignition of the fuel-air mixture within the combustion chamber prior to activation of the ignitor. Additionally, existing methods do not allow for the use of different types of ignitors (e.g., spark plugs) in a single application. End-users or vehicle operators may have different objectives in terms of the tradeoff between ignitor cost and the useful lifetime of the ignitor (e.g., the service life of the ignitor). For example, different electrode geometries and materials used for the ignitor are a primary factor in determining the service life of the ignitor. Larger and harder materials tend to reduce the rate of erosion of the electrodes. However, larger and harder electrode materials will also increase the cost of the electrodes. The systems and methods disclosed herein address these and other problems/issues by controlling the ignitor (or, multiple ignitors in the system) based on at least one of fuel quality data regarding a fuel for the engine or a characteristic regarding the ignitor.

A system according to the present disclosure includes an SI engine and an engine control unit structured to control certain components of the SI engine. The system also includes an ignition control unit and an ignitor coupled to the ignition control unit. The ignitor may be one of a plurality of ignitors in the SI engine. The ignition control unit is structured to control the ignitor based on at least one of fuel quality data of a fuel for the SI engine or a characteristic regarding the ignitor (e.g., an ignitor characteristic). The ignition control unit is structured to vary an ignition energy characteristic of the ignitor by adjusting one, or a combination of, a current supplied to the ignitor, a voltage applied across the electrodes of the ignitor, a duration of operation for the ignitor, a number of sparks generated by the ignitor during a combustion cycle, and a current waveshape of the ignitor. In some example embodiments, the ignition control unit may be structured to control the ignition energy characteristic of a plurality of ignitors on a cylinder-by-cylinder basis, which can, advantageously, improve overall engine performance by accommodating variations between combustion chambers.

A variety of benefits are associated with controlling the ignitor based on fuel quality and ignitor type. For example, in circumstances where low quality fuels are used (e.g., fuels having a reduced methane number, British thermal unit (BTU) number, lower heating value (LHV), or lower overall fuel quality relative to a baseline), the ignitability of the fuel may be reduced. In these circumstances, the ignition control unit may be structured to provide or facilitate providing additional ignition energy to the ignitor to ensure complete or near complete combustion of the air/fuel mixture (e.g., to prevent engine misfire). Increasing the ignition energy provided to the ignitor can also be beneficial during different SI engine operating states, including but not limited to, engine load rejection (e.g., offloading) and other speed load transients. In circumstances where the fuel is of higher quality, the ignition energy provided to the ignitor by the ignition control unit is reduced, thereby maximizing the useful life (e.g., service life) of the ignitor.

Similar to fuel quality, the ignitor geometry can also impact the combustion process. For example, ignitors having larger electrodes (while allowing for more erosion and longer useful life) can stifle heat transfer from the spark into the air/fuel mixture entering the combustion chamber, resulting in misfire or poor combustion. The methods disclosed herein can be used to offset this effect; for example, the ignition control unit may be structured to selectively increase the ignition energy provided to the ignitor (depending on the size of the electrode) to provide a reasonable tradeoff between ignitor characteristics and the service life of the ignitor. The methods disclosed herein can also be used to maximize engine performance for ignitors with different electrode shapes, which can impact the combustion process to varying degrees due to the effect of the electrodes on the flow field of the air/fuel mixture (e.g., the flow field of the air/fuel mixture in a gap between the electrodes of the ignitor). The ignition control unit may be structured to modify a plurality of different ignition energy characteristics in these circumstances to maximize engine performance. For example, in a high flow field environment (in which an air/fuel flow rate through a gap between electrodes of the ignitor is high leading to the generation of turbulence in the flow), the ignition control unit may be structured to increasing the current supplied to the ignitor, while simultaneously reducing the spark duration. Alternatively, or in combination, the ignition control unit may be structured to activate and deactivate the ignitor multiple times within a single combustion cycle. The ignition control unit may be structured to vary the ignition energy characteristic based on measured, sensed, or predicted spark plug electrical resistance levels, spark plug wire electrical resistance levels, ignition coil electrical resistance levels, and/or ignition system electrical resistance levels. Additionally, the ignition control unit may be structured to vary the ignition energy characteristic based on ignition component age (e.g., number of firing cycles, operating hours, or age in years). These and other advantageous features will become apparent to those reviewing the present disclosure and figures.

Referring now to FIG. 1, a block diagram of a spark-ignition engine system is shown as SI system 100, according to an example embodiment. The SI system 100 may include a gasoline internal combustion engine that uses gasoline fuel to drive the combustion process. Alternatively, the engine may be a bi-fuel internal combustion engine system, a liquid natural gas internal combustion engine system, a compressed natural gas internal combustion engine system, a biofuel internal combustion engine system, an ethanol internal combustion engine system, or another internal combustion engine system using a different type of fuel source. Thus, the engine may be any internal combustion engine type that utilizes a spark or glow from a glow plug (another type of ignitor) to cause combustion. The SI system 100 may be structured for use in a vehicle, which may be any type of on-road or off-road automobile, such as a car, truck, line-haul truck, sport utility vehicle, cross-over vehicle, van, minivan, automobile, or tractor. Alternatively, the SI system 100 may be structured for use in a residential or commercial generator set (genset) that includes an alternator to convert chemical energy into electricity.

The SI system 100 is shown to include an electronic control unit (ECU) 110, sensors 120, an ignitor 130, and a user interface 140. Each of the ECU 110, sensors 120, the ignitor 130, and the user interface 140 are coupled to the engine. The sensors 120 may be disposed within or proximate to a combustion cylinder/chamber, an intake air/fuel system, an exhaust system, and/or another component of the SI system 100. The ignitor 130 is also disposed within the combustion cylinder. In alternative embodiments, the SI system 100 may include additional, fewer, and/or different components.

Components of the SI system 100 may communicate with each other via any number of wired or wireless connections. For example, a wired connection may include a serial cable, a fiber optic cable, a CAT5 cable, or any other form of wired connection. In various example embodiments, components of the SI system 100 are connected to a vehicle network such as a controller area network (CAN bus) or a manufacturer proprietary network. As shown in FIG. 1, each one of the components of the SI system 100 is communicatively coupled to facilitate the exchange of data (e.g., instructions, commands, signals, values, etc.).

The ECU 110 includes a processor 112 and memory 114. Memory 114 stores various instructions that, when executed by the processor 112, control at least partly the operation of various components and/or subsystems of the SI system 100. The processor 112 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., and with reference to FIG. 2, the transient detection circuit 212, the ignitability assessment circuit 214, the user interface circuit 216, the combustion metrics circuit 218, the profile selection circuit 220, and/or the ignition control circuit 222 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 114 (e.g., RAM, ROM, Flash Memory, hard disk storage, etc.) may store data and/or computer code for facilitating the various processes described herein. The memory 114 may be communicably connected to the processor 112 to provide computer code or instructions to the processor 112 for executing at least some of the processes described herein. Moreover, the memory 114 may be or include tangible, non-transient volatile memory or non-volatile memory. Accordingly, the memory 114 may include database components, object code components, script components, or any other type of information structure for supporting the various activities and information structures described herein.

Sensors 120 are positioned throughout the SI system 100 to monitor and acquire data, information, etc. regarding the operational status and condition of a wide range of components and subsystems of the SI system 100. Sensors 120 may each include a physical sensor including a sensing element that is structured to determine a condition of a fluid (e.g., air, fuel, exhaust, etc.) entering, within, or leaving a combustion chamber. Alternatively, or in combination, sensors 120 may include virtual sensors structured to determine one or more parameters regarding operation of a component (e.g., a condition of a fluid, such as the fuel of the engine 105, using data from one of the other sensors 120 (e.g., analytically)). Sensors 120 may include fuel quality sensors structured to determine at least one of a methane number of the fuel, an ethanol content of the fuel, a lower heating value (LHV) of the fuel, a BTU of the fuel a viscosity of the fuel, a temperature of the fuel, a density of the fuel, or another fuel quality metric. The fuel quality sensors may be disposed within a fuel tank, within a fuel injection system, or any other suitable location that places the sensor in fluid communicating proximity with the fuel. The sensors 120 may additionally include air sensors such as a mass air flow sensor structured to measure a flow rate of air entering the combustion chamber (e.g., through an intake manifold of the SI system 100), a pressure sensor structured to measure an intake or exhaust manifold pressure, an oxygen sensor structured to measure the proportion of oxygen in the air, or another type of air sensor disposed at another location within the SI system 100.

The ECU 110 may be structured to receive and interpret sensor data including fuel quality data from the sensors 120. The ECU 110 may be structured to determine a desired ignition energy characteristic for the ignitor 130 based on the sensor data. The ignition energy characteristic can be a spark current provided to the ignitor 130, a spark voltage applied across the ignitor 130, a time period (e.g., duration) during which current/voltage is supplied to the ignitor 130, or a current waveshape of the ignitor 130 (e.g., a variation in current supplied to the ignitor 130 over time). In various exemplary embodiments, the ECU may be structured to determine whether fuel quality data (e.g., a methane number of the fuel, a BTU value regarding the fuel, a lower heating value of the fuel, etc.) received from the sensor 120 (e.g., a fuel sensor) or determined if a virtual sensor is included with the ECU is outside of an allowable range by comparing the fuel quality data to one or more predefined thresholds stored in memory 114. For example, the ECU 110 may be structured to search, scroll through, or otherwise examine a table of predefined ignition energy characteristics that correspond with the fuel quality data. Additionally, the ECU 110 may be structured to control one or more actuators or the like based on the sensor data in order to maximize engine performance or achieve one or more operator preferences.

As shown in FIG. 1, the ECU 110 is coupled to the ignitor 130 and is structured to control the ignitor 130. The ignitor 130 may include a spark plug, which includes an ignition coil (e.g., a spark coil) and/or a spark plug driver (e.g., an ignition coil, etc.). Alternatively, the ignitor 130 may be a glow plug. The ECU 110 may be structured to control an amount of current (e.g., a spark current) supplied to the ignitor 130, a voltage (e.g., a spark voltage) applied across the spark plug electrodes, a spark duration for the ignitor (e.g., a duration of time that current is supplied to the ignitor 130), or a current waveshape of the ignitor 130. The current waveshape may include a current amplitude signal applied to the ignitor 130 over a given period of time (e.g., a waveform signal), a number of sparks (e.g., re-strikes, current pulses, etc.) generated by the ignitor 130 within a single combustion cycle, or the like.

The ECU 110 is structured to receive and interpret user data, information, and/or instructions from the user interface 140. The user interface 140 may include, but is not limited to, an interactive display (e.g., a touchscreen, etc.), a dashboard, a control panel, etc. The user interface 140 may display sensor data such as fuel quality data reported by the sensors 120, the currently implemented ignition energy characteristic for the ignitor 130, and other characteristics regarding the ignitor 130 (as well as general information regarding operation of the vehicle or system, such as a speed of the vehicle). The user interface 140 may be structured to receive a characteristic regarding the ignitor 130 (e.g., an ignitor characteristic) from an operator or another user and to transmit the characteristic regarding the ignitor 130 to the ECU 110 for further processing. For example, the user interface 140 may enable a user to designate, select, or otherwise define various characteristics and parameters regarding the ignitor and fuel for the engine 105: e.g., an operator can view and select from different ignitor types, electrode sizes, electrode shapes, and other ignitor characteristics on a cylinder-by-cylinder basis and then select the most appropriate characteristics. The ECU 110 may utilize ignitor characteristics received from the user interface 140 to determine the ignition energy characteristic of the ignitor 130.

Figure 2:
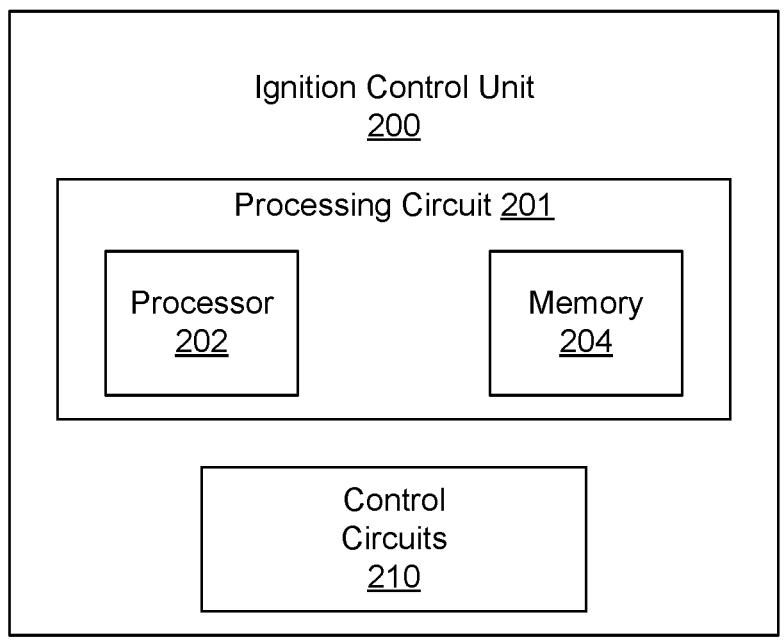
FIG. 2 is a block diagram of an ignition control unit for a spark-ignition engine, according to an example embodiment.

Referring now to FIG. 2, a block diagram of an ignition control unit (ICU) 200 that can be used to control the ignitor 130 of FIG. 1 is shown, according to an example embodiment. The ICU 200 (e.g., ignitor controller, controller, ignition system controller) may be implemented as part of the ECU 110 or as a standalone controller separate from the ECU 110. In the example shown, the ICU 200 is part of the ECU 110. Therefore, operations, activities, and functions described herein with respect to the ICU 200 may also be attributed to the ECU 110.

The ICU 200 is shown to include a processing circuit 201 including a processor 202 and memory 204. The processor 202 and memory 204 can have the same or similar structure and configuration to the processor 112 and memory 114, respectively, described with reference to FIG. 1. In an example embodiment, the processor 202 and memory 204 can be omitted, such that the ICU utilizes the processor 112 and memory 114. In other embodiments and as shown, the ICU 200 may include a dedicated processor (processor 202) and memory (memory 204).

Figure 3:
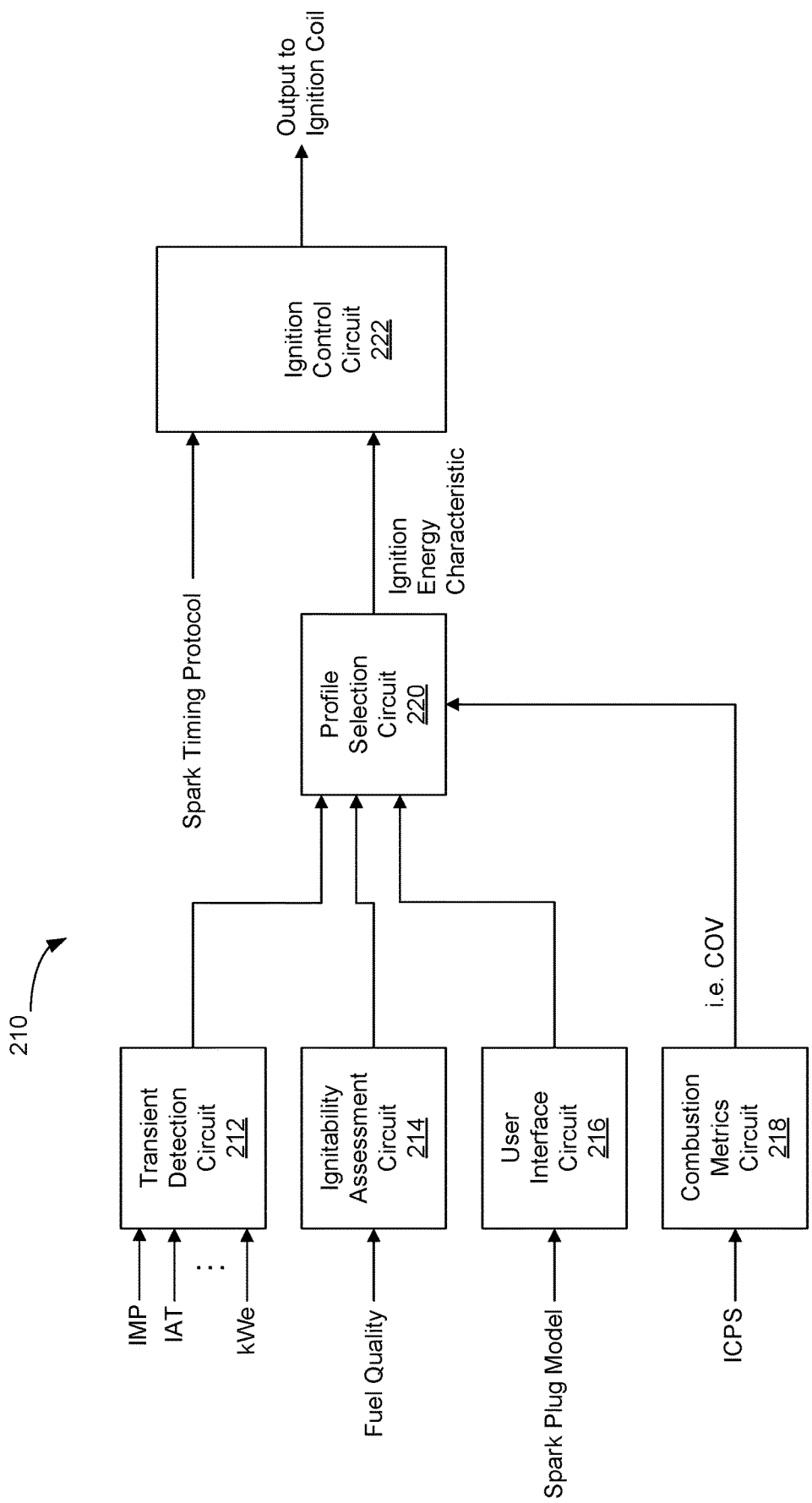
FIG. 3 is a block diagram of control circuits for the ignition control unit of FIG. 2, according to an example embodiment.

As shown in FIGS. 2-3, the ICU 200 includes a transient detection circuit 212; an ignitability assessment circuit 214; a user interface circuit 216; a combustion metrics circuit 218; a profile selection circuit 220; and an ignition control circuit 222. In one configuration, the transient detection circuit 212, the ignitability assessment circuit 214, the user interface circuit 216, the combustion metrics circuit 218, the profile selection circuit 220, and/or the ignition control circuit 222 are embodied as machine or computer-readable media that is executable by a processor, such as the processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.). The machine-readable media may be stored by the memory 204.

In another configuration, the transient detection circuit 212, the ignitability assessment circuit 214, the user interface circuit 216, the combustion metrics circuit 218, the profile selection circuit 220, and/or the ignition control circuit 222 are embodied as hardware units, such as electronic control units. As such, the transient detection circuit 212, the ignitability assessment circuit 214, the user interface circuit 216, the combustion metrics circuit 218, the profile selection circuit 220, and/or the ignition control circuit 222 may be embodied as one or more circuitry components including, but not limited to, processing circuitry, network interfaces, peripheral devices, input devices, output devices, sensors, etc. In some embodiments, the transient detection circuit 212, the ignitability assessment circuit 214, the user interface circuit 216, the combustion metrics circuit 218, the profile selection circuit 220, and/or the ignition control circuit 222 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the transient detection circuit 212, the ignitability assessment circuit 214, the user interface circuit 216, the combustion metrics circuit 218, the profile selection circuit 220, and/or the ignition control circuit 222 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the transient detection circuit 212, the ignitability assessment circuit 214, the user interface circuit 216, the combustion metrics circuit 218, the profile selection circuit 220, and/or the ignition control circuit 222 may also include programmable hardware devices such as field programmable gate arrays, programmable array logic, programmable logic devices or the like. In this regard, the transient detection circuit 212, the ignitability assessment circuit 214, the user interface circuit 216, the combustion metrics circuit 218, the profile selection circuit 220, and/or the ignition control circuit 222 may include one or more memory devices for storing instructions that are executable by the processor(s) of the transient detection circuit 212, the ignitability assessment circuit 214, the user interface circuit 216, the combustion metrics circuit 218, the profile selection circuit 220, and/or the ignition control circuit 222. The one or more memory devices and processor(s) may have the same definition as provided below with respect to the processor 202 and the memory 204. Thus, in this hardware unit configuration, the transient detection circuit 212, the ignitability assessment circuit 214, the user interface circuit 216, the combustion metrics circuit 218, the profile selection circuit 220, and/or the ignition control circuit 222 may be geographically dispersed throughout separate locations in the SI system 100 (e.g., separate control units, etc.). Alternatively, and as shown, the transient detection circuit 212, the ignitability assessment circuit 214, the user interface circuit 216, the combustion metrics circuit 218, the profile selection circuit 220, and/or the ignition control circuit 222 may be embodied in or within a single unit/housing, which is shown as the ICU 200.

In the example shown and as mentioned above, the ICU 200 includes the processor 202 and the memory 204. The ICU 200 may be structured or configured to execute or implement the instructions, commands, and/or control processes described herein with respect to the transient detection circuit 212, the ignitability assessment circuit 214, the user interface circuit 216, the combustion metrics circuit 218, the profile selection circuit 220, and/or the ignition control circuit 222. Thus, the depicted configuration represents the aforementioned arrangement where the transient detection circuit 212, the ignitability assessment circuit 214, the user interface circuit 216, the combustion metrics circuit 218, the profile selection circuit 220, and/or the ignition control circuit 222 are embodied as machine or computer-readable media. However, as mentioned above, this illustration is not meant to be limiting as the present disclosure contemplates other embodiments such as the aforementioned embodiment where the transient detection circuit 212, the ignitability assessment circuit 214, the user interface circuit 216, the combustion metrics circuit 218, the profile selection circuit 220, and the ignition control circuit 222 are configured as a hardware unit. All such combinations and variations are intended to fall within the scope of the present disclosure.

Certain operations of the ICU 200 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The transient detection circuit 212 is structured to receive sensor data that is indicative of engine operating conditions and, in particular, time-varying changes in engine performance and operating conditions. For example, the transient detection circuit 212 may be structured to receive sensor data indicative of an intake manifold pressure (IMP) indicative of a pressure of air entering the combustion chamber from the intake manifold, an intake air temperature (IAT) indicative of a temperature of air entering the combustion chamber, and an engine power metric (kWe) (e.g., an electrical power generated by the engine, a horsepower, a torque, etc.). The transient detection circuit 212 may be structured to determine (e.g., based on sensor data) and characterize (e.g., by comparing sensor data using known relationships) changes in the operating state of the SI system 100 (see also FIG. 1). For example, the transient detection circuit 212 may be structured to identify load rejection and/or other speed/load transients in response to changes in engine rotational speed, ignition engine state, or the like. The transient detection circuit 212 may receive sensor data from an engine rotational speed sensor (e.g., a tachometer) that indicates a change in rotational speed of the engine. The transient detection circuit 212 may also be structured to calculate rates of change using sensor data (e.g., analytically by subtracting two values of rotational speed over a predefined time period and dividing the result by the predefined time period). The transient detection circuit 212 may compare the rate of change to a list of engine speed/load transients that correspond with the rate of change (e.g., engine startup, cold start cranking, etc.). In another example, the transient detection circuit 212 may receive sensor data from an IMP sensor indicative of a change in operating altitude. The transient detection circuit 212 may be structured to determine the approximate operating altitude using a predefined algorithm relating IMP to altitude or by search, scrolling, or otherwise referencing a list/table of altitudes that correspond to different values of IMP. In yet another example, the transient detection circuit 212 is structured to determine a charge quality of air entering the combustion chamber from an exhaust gas circulation system based on sensor data from the IAT sensor, the IMP sensor, or another exhaust or intake air quality sensor.

The ignitability assessment circuit 214 is structured to receive fuel quality data from one or more fuel quality sensors (e.g., sensors 120 of FIG. 1). Alternatively, or in combination, the ignitability assessment circuit 214 may be structured to determine fuel quality data using one or more algorithms (e.g., an ethanol number may be calculated from a methane number of the fuel in combination with other known fuel quality data, etc.). The fuel quality data may include at least one of (e.g., one, or a combination of) a methane number of the fuel, an ethanol content of the fuel, an octane number of the fuel (e.g., 87, 89, 91), a BTU value regarding the fuel, a LHV of the fuel, or another fuel quality metric or combination of fuel quality metrics. The fuel quality data may be used to determine what type of fuel is being used (e.g., if a separate or secondary fuel is used at engine startup, etc.). The fuel quality data may also include a humidity level or moisture content of the fuel (e.g., a humidity level in the fuel tank or fuel line using a humidity sensor). The ignitability assessment circuit 214 may be structured to determine a likelihood (e.g., probability) of the fuel igniting based on the fuel quality data. For example, the ignitability assessment circuit 214 may be structured to access a list/table of combustion probabilities associated with different fuel compositions or different values of fuel quality data (e.g., methane number, etc.). The ignitability assessment circuit 214 may be structured to search through the list of combustion probabilities based on the fuel quality data from the fuel quality sensor in order to determine the combustion probability.

In various example embodiments, the ignitability assessment circuit 214 may be structured to determine an ignitability metric indicative of a likelihood that the fuel will ignite under a given set of operating conditions (e.g., using a current set of ignition energy characteristics, etc.). The ignitability metric may be a percentage likelihood that ignition will occur (e.g., an ignitability metric over 0.8 may indicate that there is a high chance the fuel will be ignited using current values of the ignition energy characteristic). Larger values of the ignitability metric may be indicative of high fuel quality (e.g., a large methane number, a larger LHV, etc.), while small values may be indicative of poor fuel quality.

The user interface circuit 216 is structured as a human-machine interface for, e.g., the ICU 200. As shown in FIG. 3, the user interface circuit 216 is structured to receive and interpret commands from a user interface that is operably coupled to the ICU 200, such as the user interface 140 of FIG. 1. For example, the user interface circuit 216 may be structured to receive one or more characteristics (e.g., ignition characteristics) regarding an ignitor for an SI engine (e.g., the ignitor 130 of the SI system 100 of FIG. 1). The characteristics may include a type of the ignitor, a condition of the ignitor, and/or a brand of the ignitor. The type of the ignitor may include at least one of (e.g., one or a combination of) an electrode size, an electrode shape, and an electrode material. The electrode size may include a diameter of the electrode, a spacing (e.g., a gap size) between a central electrode and a ground electrode, a length of the electrode, or the like. The electrode shape may include a cross-sectional shape of the electrode (e.g., circular, etc.). The electrode material may include one, or a combination of copper, platinum, iridium, silver, or another electrode material. The condition of the ignitor may include at least one of an age of the ignitor, a number of operating hours of the ignitor, a number of firing cycles of the ignitor, and/or any other parameter based on input from an operator or another user. In certain embodiments, a user may be able to provide a model number of the ignitor and characteristics regarding the ignitor are automatically retrieved (characteristics regarding multiple ignitors may be stored in the memory 204). In other embodiments, the ICU may communicate with a remote database to retrieve the characteristics of the ignitor after reception of the model number (or another ignitor identifying feature). In yet other embodiments, the user may specifically define and input the relevant characteristics of the ignitor. In still other embodiments, characteristics regarding the ignitor may be pre-programmed into the memory 204 as part of the manufacturing and selling process of the system 100.

The combustion metrics circuit 218 is structured to receive and interpret combustion data indicative of combustion performance for the SI engine. In some embodiments, the combustion metrics circuit 218 is structured to receive and interpret combustion data for individual cylinders (e.g., individual combustion chambers within the SI engine). In other embodiments, the combustion data may be for a group of cylinders (e.g., all the cylinders, such that a representative value is determined). In yet other embodiments, the combustion data may be for a bank of cylinders (e.g., a bank of cylinders on a first side of the engine (4 of 8), etc.). The combustion metrics circuit 218 may be communicatively coupled to one or more sensors integrated into or disposed proximate to the combustion chamber. For example, the combustion metrics circuit 218 may be structured to receive sensor data from an integrated combustion pressure sensor (ICPS) in order to determine real-time pressure fluctuations within the combustion chamber. In other embodiments, the combustion metrics circuit 218 may be structured to receive sensor data from an integrated combustion temperature sensor (ICTS) that is structured to output a signal that is indicative of a temperature inside the combustion chamber. The signal received from the ICPS or the ICTS (by the combustion metric circuit 218) may be a voltage, a current, or another signal type. The combustion metrics circuit 218 may be structured to convert the signal into a known value of pressure or temperature using predefined algorithms or calibration data. Similar conversions may be performed by any of the other circuits in order to interpret sensor data (e.g., the transient detection circuit 212, the ignitability assessment circuit 214, the user interface circuit 216, the profile selection circuit 220, and/or the ignition control circuit 222). The combustion metrics circuit 218 may be structured to determine a combustion variability metric based on in-chamber sensor data (e.g., sensor data from sensors disposed within, or in proximity to, the combustion chamber). For example, the combustion metrics circuit 218 may be structured to determine an indicated mean effective pressure based on sensor data from the IMEP, and/or a coefficient of variance (COV) of IMEP indicative of a variability in indicated work per combustion cycle using known algorithms (e.g., empirical relationships, etc.).

In various example embodiments, the combustion metrics circuit 218 may be structured to determine the condition of the ignitor based on in-chamber sensor data, fuel quality data, an electrical resistance of the ignitor 130 (e.g., an electrical resistance across the ignitor 130 or an ignitor coil coupled to the ignitor 130), or another parameter. The condition may be an amount of contamination (e.g., fouling) of the ignitor 130 or an amount of erosion of the electrodes (e.g., an amount of electrode material remaining on the electrodes). The contamination of the electrodes and the erosion of the electrodes may be determined, at least in part, based on a reduction in the electrical resistance over a predefined time interval. In one example, the combustion metrics circuit 218 is structured to determine an amount of silica deposited on the electrodes based on a level of siloxanes in the fuel (e.g., the level measured by at least one fuel quality sensor, etc.), which is converted to silica during the combustion process. The combustion metrics circuit 218 may be structured to determine an approximate age of the ignitor 130, which may correspond with a given amount of electrode erosion. For example, the combustion metrics circuit 218 may be structured to determine a number of combustion cycles associated with the ignitor by monitoring a number of pressure fluctuations reported by the ICPS and to compare the number of pressure fluctuations with a threshold value of pressure fluctuations stored in memory 204 (e.g., a threshold value corresponding to a maximum number of pressure fluctuations that may be experienced over the useful operating life of the ignitor 130, etc.). In another example, a time value may be associated with the ignitor (e.g., hours on of the vehicle may correspond with an age of the ignitor). In either example, a table, such as look-up table, may be used to correlate this value with an erosion indicator in order to determine or estimate the amount of erosion on the ignitor. For example, 500 hours of operation of the engine system may correspond with an erosion index value of 0.4, and anything above a threshold (e.g., 0.8) could be considered a substantial amount of erosion. Similarly, the amount of contamination may correspond with a contamination index value (e.g., 0-1) and anything above a threshold (e.g., 0.8) could be considered a substantial amount of contamination. The combustion metrics circuit 218 is structured to determine an approximate maximum operating temperature that the ignitor has been exposed to over its operating life by comparing the electrical resistance across the ignitor 130 with a threshold value of ignitor resistance stored in memory 204.

As shown in FIG. 3, the ICU 200 also includes a profile selection circuit 220. The profile selection circuit 220 is structured to receive and interpret information from one or a combination of the aforementioned circuits (e.g., the transient detection circuit 212, the ignitability assessment circuit 214, the user interface circuit 216, and/or the combustion metrics circuit 218). In some embodiments, the profile selection circuit 220 is structured to determine a plurality of ignition energy characteristics for an ignitor based on the information received from the circuits 212, 214, 216, 218. In various example embodiments, the profile selection circuit 220 is structured to minimize the ignition energy characteristic of the ignitor in response to information received from the circuits 212, 214, 216, 218. For example, the profile selection circuit 220 may be structured to determine a minimum overall ignition energy that is required to increase a likelihood of combustion to above a predefined threshold for an ignitor of a predefined size (as reported by the user interface circuit 216) and a fuel of a given quality (as reported by the ignitability assessment circuit 214).

The profile selection circuit 220 may be structured to continuously update the ignition energy characteristics in response to changes in the information received from the circuits 212, 214, 216, 218 in order to maximize engine performance and the lifetime (e.g., service life) of the ignitor. For example, the profile selection circuit 220 may continuously query the transient detection circuit 212 at a first sampling rate. The profile selection circuit 220 may receive data from the transient detection circuit 212 of FIG. 3 that indicates a decreasing operating altitude of the engine (e.g., a decreasing value of IMP over a first time period corresponding to the first sampling rate). The data may include instructions to increase the spark current or voltage applied to the ignitor (e.g., the ignitor 130 of FIG. 1) by a first target value in order to maximize the likelihood of combustion (for a given air-fuel ratio and turbocharger setup). For example, an average value of the IMP may decrease steadily over a 5, 10, or 15 minute period to indicate that the operating altitude is increasing. The transient detection circuit 212 may access a lookup table that includes values of altitude and IMP in order to determine the change in altitude and the required change in spark current or voltage (e.g., increasing the voltage by a first target value of 10% to account for an increase in altitude, etc.).

The profile selection circuit 220 may receive data from the ignitability assessment circuit 214 in addition to the data from the transient detection circuit 212. The profile selection circuit 220 may continuously query the ignitability assessment circuit 214 at the first sampling rate or at a second sampling rate that is different from the first sampling rate. The profile selection circuit 220 may be structured to differentiate the data from each of the circuits 212, 214; for example, based on a type of data received (e.g., an absolute range of the data) or a data type identifier (e.g., an integer value used to flag data from different sources). For example, a data type identifier of 1 may correspond to data received from the ignitability assessment circuit 214, while a data type identifier of 2 may correspond to data received from the transient detection circuit 212. The profile selection circuit 220 may receive data from the ignitability assessment circuit 214 (e.g., data type identifier 1) that indicates a high methane number relative to an upper threshold methane number (for current values of the spark current or voltage applied to the ignitor). For example, the profile selection circuit 220 may receive data that indicates a methane number of 85 relative to an upper threshold methane number of 80. The data from the ignitability assessment circuit 220 may include instructions to decrease the spark current or voltage applied to the ignitor by a second target value in order to maximize the useful operating life (e.g., service life) of the ignitor. For example, ignitability assessment circuit 214 may access a lookup table that includes a list of different methane numbers and the minimum required spark current or voltage that corresponds with each value or range of methane numbers. The ignitability assessment circuit 214 may determine a difference between the real-time spark current or voltage and the minimum required current or voltage. The profile selection circuit 220 may be structured to compare the instructions from the ignitability assessment circuit 214 and the transient detection circuit 212 and to preferentially weight instructions that request an increase in the spark current or voltage applied to the ignitor (e.g., in order to prevent issues such as knocking, which could damage the engine over time). For example, the profile selection circuit 220 may ignore the instructions from the ignitability assessment circuit 214 that would result in a decrease in the spark current or voltage (e.g., a methane number of 85 when the minimum required methane number is 80) in a scenario where the transient detection circuit 212 instructs the profile selection circuit 220 to increase the spark current or voltage (e.g., in response to a reduction in altitude determined based on IMP data as described above). The profile selection circuit 220 may also be structured to compare the first and second target values to determine a maximum allowable change in the ignition energy characteristic that could be implemented without risking damage to the engine. For example, the profile selection circuit 220 could access lookup tables of spark current or voltage as a function of methane number and altitude to determine to what extent the current or voltage may be reduced before the probability of ignition reduces below a predefined threshold (e.g., 0.8, etc.)

In other embodiments, the profile selection circuit 220 is structured to update the ignition energy characteristic using an algorithm. The algorithm may be an empirical algorithm that provides a minimum value of the ignition energy characteristic that may be used for various combinations of conditions (e.g., altitude, fuel quality, etc.). The profile selection circuit 220 may be structured to process the data from each of the circuits 212, 214, 216, 218 in order to determine the minimum value of the ignition energy characteristic that corresponds to the combination of data.

As shown in FIG. 3, the profile selection circuit 220 is structured to output or otherwise provide the ignition energy characteristics to an ignition control circuit 222. The ignition control circuit 222 is structured to output a control signal to an ignitor based on the ignition energy characteristics. For example, based on the combination of data from the transient detection circuit 212 and the ignitability assessment circuit 214 as described above, the profile selection circuit 220 may be structured to output the first target value of the spark current or voltage (e.g., the first target ignition energy characteristic) to the ignition control circuit 222. The ignition control circuit 222 may be structured to output a control signal (e.g., voltage, current, etc.) to the ignitor or an ignitor coil to increase the spark current or voltage to be approximately equal to the first target value. In some embodiments, the profile selection circuit 220 is additionally structured to output other, baseline values of the ignition energy characteristics to the ignitor. For example, the profile selection circuit 220 may be structured to output a predefined spark timing protocol (e.g., ignition timing, timing advance, etc.) to the ignition control circuit 222, which may be determined based the fuel type and the geometry of the combustion chamber, among other factors.

Figure 4:
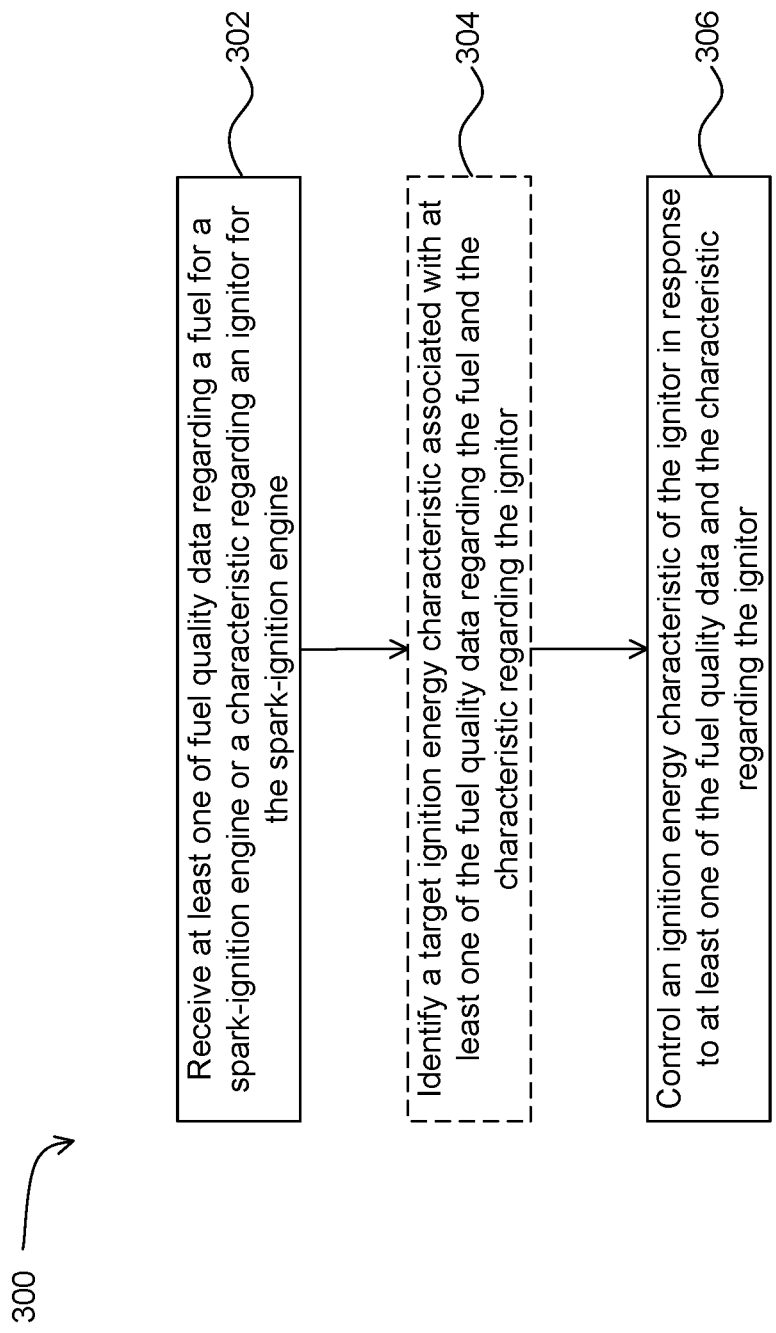
FIG. 4 is a flow diagram of a method of controlling an ignition energy characteristic of an ignitor for a spark-ignition engine, according to an example embodiment.

FIG. 4 shows a flow diagram of a method 300 of controlling an ignition energy characteristic of an ignitor for an SI engine, according to an example embodiment. In alternative embodiments, the method 300 may include additional, fewer, and/or different operations. The method 300 of FIG. 4 may be implemented using the ICU 200 described with reference to FIG. 3; for example, in order to control the ignitor 130 for the SI system 100 of FIG. 1.

At 302, the ICU 200 receives at least one of (e.g., one, or a combination of) fuel quality data regarding a fuel for the SI system 100 or a characteristic regarding the ignitor 130 for the SI system 100. The fuel quality may be one of a methane number of the fuel, an ethanol content of the fuel, an LHV of the fuel, or another fuel quality metric. The characteristic regarding the ignitor 130 (e.g., the ignitor characteristic) may include a type of the ignitor 130 (e.g., an electrode size or an electrode shape), and/or a condition of the ignitor 130 (e.g., an age of the ignitor 130, a number of operation hours of the ignitor 130, a number of firing cycles of the ignitor 130, an electrical resistance of the ignitor 130 and/or the ignitor coil, etc.). In some embodiments, block 302 may additionally include determining a derived, determined, predicted, estimated, etc. fuel quality metric based on the fuel quality data (e.g., an overall fuel quality based on a combination of fuel quality data from a plurality of fuel quality sensors). For example, block 302 may include determining an LHV of the fuel based on the fuel quality data indicative of a methane number of the fuel by applying a predefined algorithm of LHV as a function of methane number.

At 304, the ICU 200 identifies a target ignition energy characteristic associated with at least one of (e.g., one or a combination of) the fuel quality data regarding the fuel or the characteristic regarding the ignitor 130. The target ignition energy characteristic may be determined by the profile selection circuit 220; for example, by searching, scrolling, or otherwise examining a predefined list of ignition energy characteristics that are associated with different fuel quality thresholds and/or ignitor characteristics thresholds. The list of ignition energy characteristics may include predefined threshold values for the methane number of the fuel, the LHV of the fuel, the electrical resistance of the ignitor 130 and/or ignition coil, and other fuel quality and ignitor characteristic thresholds. The predefined threshold values may include both lower threshold values and upper threshold values in order to accommodate various different engine operating states while minimizing the overall ignition energy supplied to the ignitor 130.

At 306, the ICU 200 controls the ignition energy characteristic of the ignitor 130 in response to the at least one of the fuel quality data regarding the fuel or the characteristic regarding the ignitor 130. Process 306 may include adjusting at least one of a spark current of the ignitor 130 (e.g., a current amplitude), a spark voltage of the ignitor 130 (e.g., a voltage amplitude), or a current waveshape of the ignitor 130. For example, block 306 may include increasing the spark current or voltage based on a determination that the fuel quality is below a threshold value (in order to prevent knocking), or based on a determination that the electrical resistance of the ignitor 130 and/or the ignitor coil is above a threshold value (in order to clean the electrodes or to compensate for electrode erosion). Process 306 may additionally include adjusting a number of sparks generated by the ignitor 130 within a single combustion cycle (e.g., by adjusting the current waveshape of the ignitor 130, etc.). For example, process 306 may include increasing a number of sparks based on a determination that the fuel quality is below a threshold value (again, in order to prevent knocking). In some embodiments, the ignition energy characteristic may be adjusted on a cylinder-by-cylinder basis; for example, based on a determination that the combustion performance (e.g., temperature, pressure, etc.) varies between cylinders (due to slight differences in ignitor characteristics, etc.). In other embodiments, the ignition energy characteristics of each cylinder (e.g., combustion chamber) may be adjusted collectively (e.g., an approximately equal adjustment may be made to each one of the ignitors 130 within the SI system 100).

Figure 5:
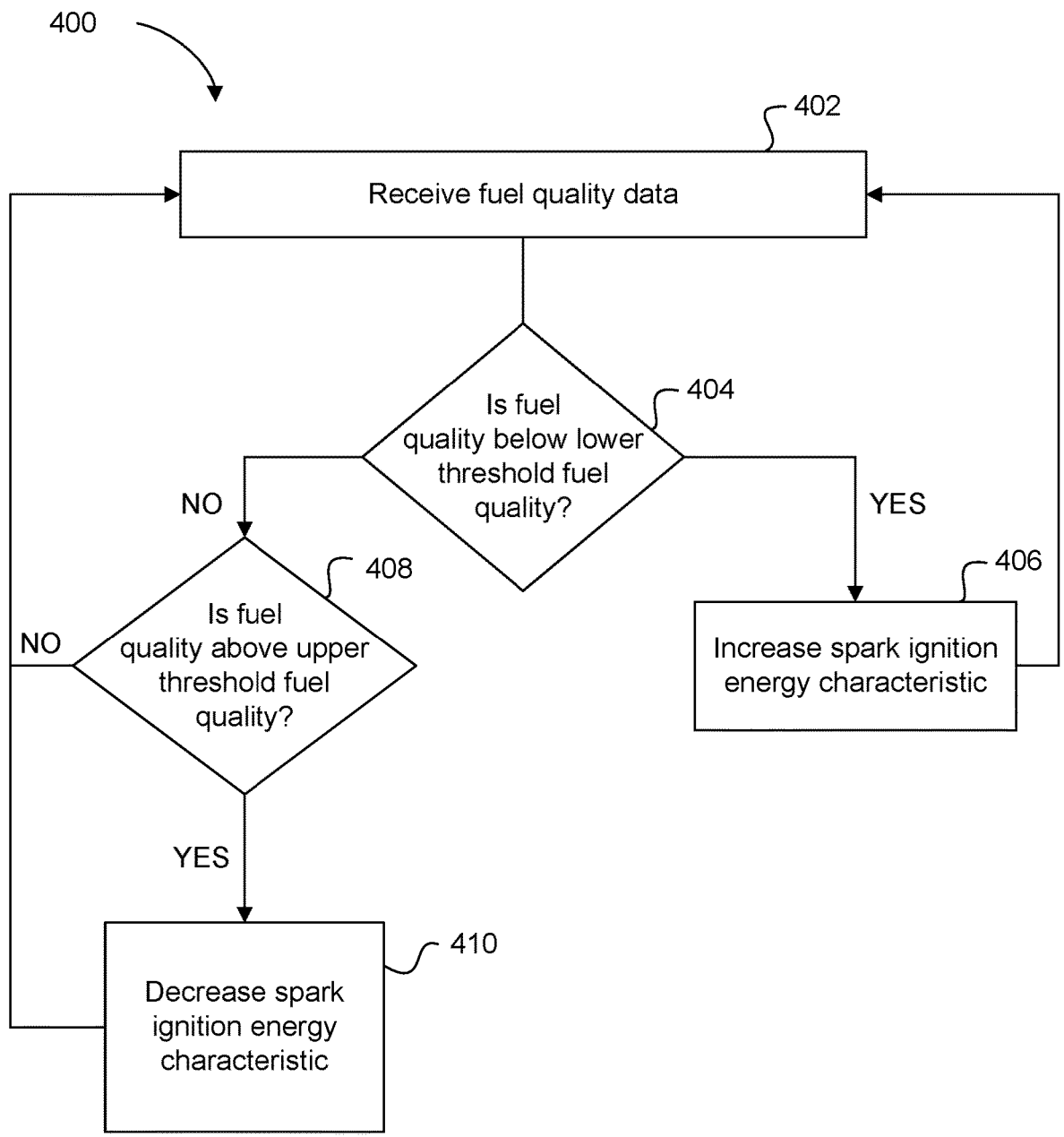
FIG. 5 is a flow diagram of a method of controlling an ignition energy characteristic based on fuel quality data regarding a fuel of a spark-ignition engine, according to an example embodiment.

FIG. 5 is a flow diagram of a method 400 for controlling an ignition energy characteristic of an ignitor such as the ignitor 130 of FIG. 1, based on fuel quality data regarding a fuel for an SI engine (e.g., the SI system 100 of FIG. 1), according to an example embodiment. In alternative embodiments, the method 400 may include additional, fewer, and/or different operations. The method 400 includes continuously monitoring a fuel quality for the SI system 100 and selectively adjusting an ignition energy characteristic of the ignitor 130 based on the fuel quality. At 402, fuel quality data is received from one or more fuel quality sensors. Process 402 may include querying the sensors at periodic intervals. The fuel quality data may include a single data point of fuel quality data in time (e.g., a real-time fuel quality) or an average of a plurality of data points collected during a given time interval. In an example embodiment, block 402 includes receiving at least one of a methane number or an LHV of the fuel.

At 404, the fuel quality data is compared to a lower threshold fuel quality. Block 404 may include accessing a list of threshold values stored in memory 204 (via processor 202) to determine whether the fuel quality is within an allowable range between an upper threshold value and a lower threshold value. For example, block 404 may include comparing (via processor 202) the at least one of the methane number or the LHV of the fuel to a predefined lower threshold stored in memory 204 (e.g., a lower threshold fuel quality, a lower threshold methane number, a lower threshold LHV, etc.). In the event the methane number and/or the LHV of the fuel exceeds the lower threshold value, the method 400 proceeds to 406. At 406, an ignition energy characteristic of the ignitor 130 is increased in order to improve the likelihood of ignition. Block 406 may include increasing at least one of a current or a duration of a spark of the ignitor 130 in order to increase the likelihood of ignition. Alternatively, or in combination, block 406 may include increasing a number of sparks generated by the ignitor 130 within a single combustion cycle. The ignition energy characteristic may be increased by a predefined value, in proportion to a difference between the fuel quality and the lower threshold value, or incrementally until adequate engine performance is re-established (e.g., until in-chamber sensor data returns to within the allowable range, until the operating state of the engine changes, etc.).

The method 400 includes minimizing the spark ignition energy characteristic of the ignitor 130 in order to maximize the useful operating life of the ignitor 130. In the event the fuel quality is above the lower threshold value which is indicative of reasonable fuel quality (e.g., fuel that is of high enough quality to prevent knocking with the current spark ignition energy characteristics), the method 400 proceeds to blocks 408-410. At 408, the fuel quality is compared to an upper threshold value. The upper threshold value could be an upper threshold fuel quality. In some embodiments, the upper threshold fuel quality could be an upper threshold methane number. In other embodiments, the upper threshold fuel quality could be an upper threshold LHV, or another fuel quality parameter. In the event the fuel quality exceeds the upper threshold value, the method proceeds to block 410. At 410, an ignition energy characteristic of the ignitor 130 is decreased in order to prevent excessive erosion of the electrodes of the ignitor 130. Block 410 may include decreasing at least one of a current or a duration of a spark of the ignitor 130 in response to improved fuel quality. Alternatively, or in combination, block 410 may include decreasing a number of sparks generated by the ignitor 130 during a single combustion cycle. The ignition energy characteristic may be decreased by a predefined value, in proportion to a difference between the fuel quality and the upper threshold value, or incrementally to minimize electrode erosion (e.g., until in-chamber sensor data returns to within the allowable range, until the operating state of the engine changes, etc.). In the event the fuel is within the allowable range between the upper threshold value and the lower threshold value, method 400 returns to block 402 and the process repeats. Method 400 includes repeating blocks 402-410 as needed to maximize engine performance and the service life of the ignitor 130.

Figure 6:
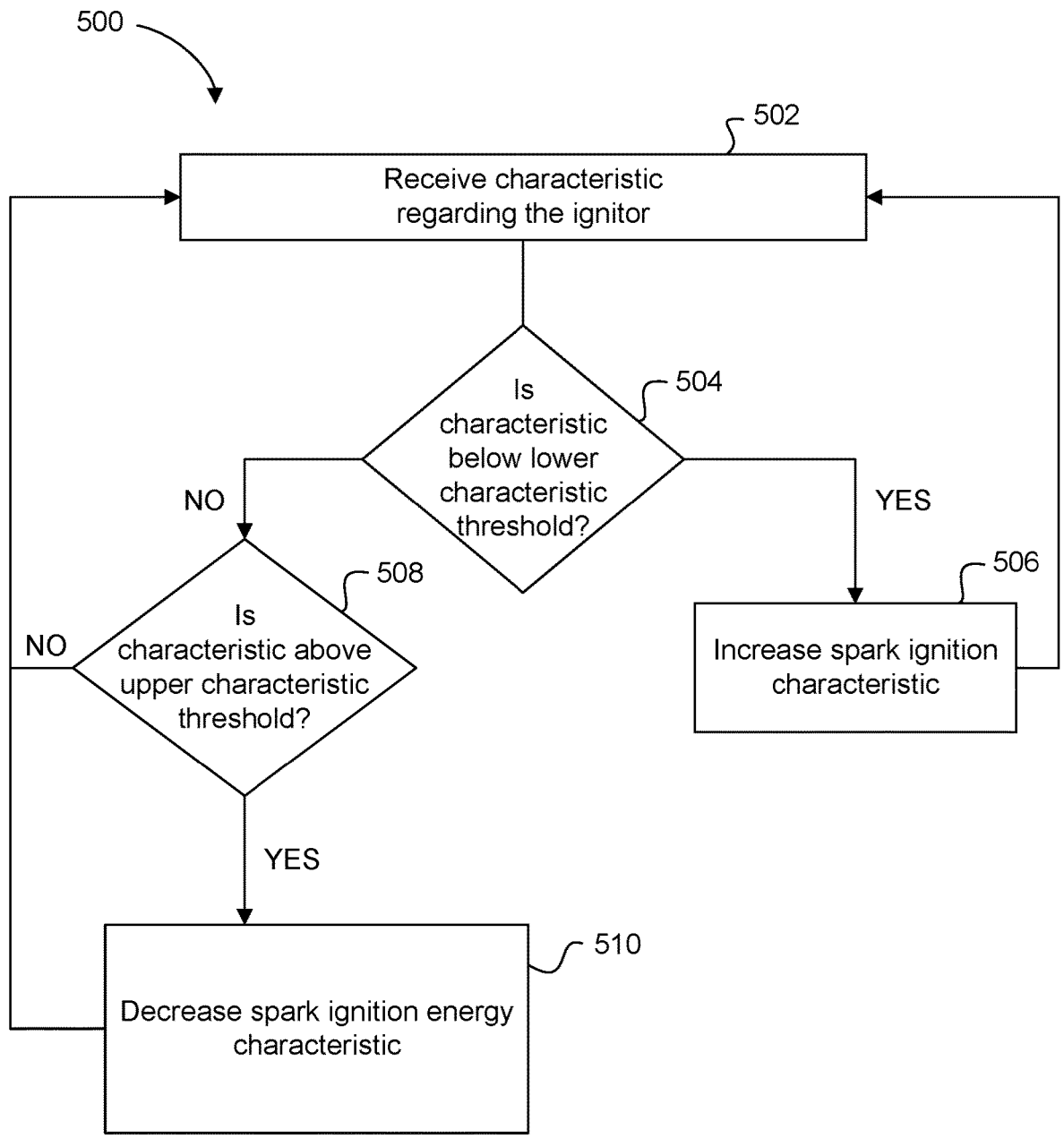
FIG. 6 is a flow diagram of a method of controlling an ignition energy characteristic based on a characteristic regarding an ignitor of a spark-ignition engine, according to an example embodiment.

FIG. 6 is a flow diagram of a method 500 for controlling an ignition energy characteristic of an ignitor such as the ignitor 130 of the SI system 100 FIG. 1, based on a characteristic regarding the ignitor 130, according to an example embodiment. In alternative embodiments, the method 500 may include additional, fewer, and/or different operations. As shown, the method 500 of FIG. 6 is the same or similar to the method 400 of FIG. 5. In various example embodiments, the characteristic regarding the ignitor 130 is an electrical resistance of at least one of the ignitor 130 or an ignition coil of the ignitor 130. The electrical resistance may be indicative of an age, a condition, or a type of the ignitor 130. Blocks 502-506 include increasing an ignition energy characteristic in response to the characteristic regarding the ignitor being below a predefined threshold (e.g., a lower threshold value, a lower threshold characteristic, a lower threshold electrical resistance, etc.). The ignition energy characteristic may be at least one of a current or a duration of a spark of the ignitor 130, or another ignition energy characteristic. Blocks 508-510 include decreasing an ignition energy characteristic in response to the characteristic regarding the ignitor 130 being above a predefined threshold (e.g., a lower threshold value, a lower threshold characteristic, a lower threshold electrical resistance, etc.), in order to maximize the service life of the ignitor 130.

It will be appreciated that the method 500 of FIG. 6, and variations thereof, may also be applied to return other characteristics regarding the ignitor 130 to within an allowable operating range in order to improve overall engine performance. For example, the characteristic regarding the ignitor 130 may include spark plug electrode size and/or shape. The method may include modifying a plurality of ignition energy characteristics in response to the characteristic regarding the ignitor 130 being outside of the allowable range. Each one of the plurality of ignition energy characteristics may be modified independently (e.g., increased or decreased) in order to improve engine performance over a wide range of operating conditions.

In various example embodiments, any of the operations described herein are implemented at least in part as computer-readable instructions stored on a non-transitory computer-readable medium. Upon execution of the computer-readable instructions by a processor (e.g., processors 112 or 202), the computer-readable instructions can cause the ICU 200 to perform the operations. For example, with reference to method 300 of FIG. 4, the instructions may be operating instructions causing the processor 202 to receive fuel quality data regarding a fuel for an SI engine (e.g., the SI system 100 of FIG. 1) and a characteristic regarding an ignitor (e.g., the ignitor 130) of the SI engine. The instructions may cause the processor 202 to control the ignitor (e.g., to transmit a control signal to the ignitor, etc.) in response to at least one of the fuel quality data regarding the fuel or the characteristic regarding the ignitor.

For example, in a high flow field environment (in which an air/fuel flow rate through a gap between electrodes of the ignitor is high leading to the generation of turbulence in the flow), the ignition control unit may be structured to increasing the current supplied to the ignitor, while simultaneously reducing the spark duration. Alternatively, or in combination, the ignition control unit may be structured to activate and deactivate the ignitor multiple times within a single combustion cycle. For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 2-3, it should be understood that the ICU 200 may include any number of circuits for completing the functions described herein. For example, the activities and functionalities of the transient detection circuit 212, the ignitability assessment circuit 214, the user interface circuit 216, the combustion metrics circuit 218, the profile selection circuit 220, and/or the ignition control circuit 222 may be combined in multiple circuits or as a single circuit. Additional circuits with additional functionality may also be included. Further, it should be understood that the ICU 200 may further control other activity beyond the scope of the present disclosure.

As mentioned above and in one configuration, the "circuits" may be implemented in machine-readable medium for execution by various types of processors, such as processor 112 of FIG. 1 or processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
receiving, from a user interface and by a controller, a characteristic regarding an ignitor for a spark-ignition engine; and
controlling, by the controller, an ignition energy characteristic of the ignitor in response to the characteristic regarding the ignitor for the spark-ignition engine.

2. The method of claim 1, wherein the characteristic regarding the ignitor comprises a condition of the ignitor, the condition comprising at least one of an age of the ignitor, a number of operating hours of the ignitor, or a number of firing cycles of the ignitor.

3. The method of claim 1, wherein controlling the ignition energy characteristic of the ignitor comprises adjusting at least one of a spark current of the ignitor, a spark voltage of the ignitor, a spark duration for the ignitor, or a current waveshape of the ignitor.

4. The method of claim 1, wherein controlling the ignition energy characteristic of the ignitor comprises adjusting a number of sparks generated by the ignitor within a single combustion cycle.

5. The method of claim 1, further comprising receiving fuel quality data regarding a fuel for the spark-ignition engine, wherein receiving the fuel quality data regarding the fuel for the spark-ignition engine comprises receiving at least one of a methane number or a lower heating value of the fuel, and wherein the method further comprises comparing the at least one of the methane number or the lower heating value of the fuel to a predefined threshold and in response to the at least one of the methane number or the lower heating value of the fuel being below the predefined threshold, increasing at least one of a current or a duration of a spark of the ignitor.

6. The method of claim 1, wherein receiving the characteristic regarding the ignitor comprises receiving a type of the ignitor, the type comprising at least one of an electrode size or an electrode shape.

7. The method of claim 1, further comprising minimizing the ignition energy characteristic of the ignitor in response to the characteristic regarding the ignitor.

8. The method of claim 1, further comprising identifying a target ignition energy characteristic associated with the characteristic regarding the ignitor, and adjusting the ignition energy characteristic to match or substantially match the target ignition energy characteristic.

9. The method of claim 1, wherein in response to an electrical resistance level of at least one of the ignitor or an ignition coil of the ignitor being below a predefined threshold, the method further comprises increasing at least one of a current or a duration of a spark of the ignitor.

10. An apparatus, comprising:
an ignition control circuit comprising a memory storing machine readable instructions and a processor, the machine readable instructions structured to cause the processor to perform operations comprising:
receiving, from a user interface, a characteristic regarding an ignitor of a spark-ignition engine; and
controlling an ignition energy characteristic of the ignitor in response to the characteristic regarding the ignitor for the spark-ignition engine.

11. The apparatus of claim 10, wherein the machine readable instructions are structured to cause the processor to perform further operations comprising: receiving fuel quality data regarding a fuel for the spark-ignition engine, and controlling the ignition energy characteristic of the ignitor in response to the fuel quality data regarding the fuel, wherein the fuel quality data is at least one of a methane number or a lower heating value of the fuel.

12. The apparatus of claim 11, wherein in response to at least one of the methane number or the lower heating value of the fuel being below a predefined threshold, the machine readable instructions cause the processor to at least one of increase a current or a duration of a spark of the ignitor.

13. The apparatus of claim 11, wherein in response to at least one of the methane number or the lower heating value of the fuel being above a predefined threshold, the machine readable instructions cause the processor to at least one of decrease a current or a duration of a spark of the ignitor.

14. The apparatus of claim 13, wherein controlling the ignition energy characteristic of the ignitor includes controlling a spark current, a spark voltage, a spark duration, and a current waveshape.

15. The apparatus of claim 10, wherein in response an electrical resistance level of at least one of the ignitor or an ignition coil of the ignitor being below a predefined threshold, the machine readable instructions cause the processor to at least one of increase a current or a duration of a spark of the ignitor.

16. A system, comprising:
an ignition control unit;
a user interface coupled to the ignition control unit, the user interface structured to receive a characteristic regarding an ignitor; and
the ignitor coupled to the ignition control unit, the ignition control unit structured to control the ignitor based on the characteristic regarding the ignitor.

17. The system of claim 16, wherein the characteristic regarding the ignitor is at least one of a type of the ignitor or a condition of the ignitor, wherein the type comprises at least one of an electrode size or an electrode shape, and wherein the condition comprises at least one of an age of the ignitor, a number of operating hours of the ignitor, or a number of firing cycles of the ignitor.

18. The system of claim 16, wherein the ignition control unit is structured to control the ignitor based on fuel quality data of a fuel for a spark-ignition engine, wherein the fuel quality data includes at least one of a methane number or a lower heating value, and wherein in response to the at least one of the methane number or the lower heating value of the fuel being above a predefined threshold, the ignition control unit is structured to at least one of decrease a current or a duration of a spark of the ignitor.

19. The system of claim 16, wherein in response to at least one of an electrical resistance of the ignitor or an electrical resistance level of an ignition coil of the ignitor being below a predefined threshold, the ignition control unit is structured to at least one of decrease a current or a duration of a spark of the ignitor.

* * * * *